United States Patent [19]

Sahasrabudhe

[11] 3,966,148
[45] June 29, 1976

[54] SIGNAL THRESHOLD RESPONSIVE APPARATUS

[75] Inventor: Arun P. Sahasrabudhe, Monroeville, Pa.

[73] Assignee: Westinghouse Electric Corporation, Pittsburgh, Pa.

[22] Filed: Apr. 15, 1975

[21] Appl. No.: 568,225

[52] U.S. Cl. .......................... 246/34 R; 246/167 R; 246/187 B
[51] Int. Cl.² ......................................... B61L 21/06
[58] Field of Search .......... 246/34 R, 34 CT, 187 B, 246/182 R, 167 R, 122 R, 28 R

[56] References Cited
UNITED STATES PATENTS

| | | | |
|---|---|---|---|
| 3,046,454 | 7/1962 | Staples | 246/34 R |
| 3,482,090 | 12/1969 | Wilcox | 246/187 B |

Primary Examiner—Trygve M. Blix
Assistant Examiner—Reinhard J. Eisenzopf
Attorney, Agent, or Firm—R. G. Brodahl

[57] ABSTRACT

There is disclosed an input signal threshold responsive apparatus for responding to a predetermined input signal energy level, in relation to a voltage and time product, before an associated train vehicle control system is enabled by a provided gated enable signal. The provided apparatus responds to one of a plurality of input signals, having respectively different frequencies and different amplitudes, and provides an enabling output signal.

It is desired to provide an improved-threshold sensitive input signal receiver apparatus in conjunction with train vehicle control and in relation to plural stray signals in a given track circuit signal block due to cross talk from adjacent signal blocks and the like. The input signal responsive or sensitivity threshold is established in relation to the practical required signal level of the desired signal to be received within the given signal block.

The present signal responsive apparatus is operative in conjunction with a train vehicle carried speed coded signal for controlling the speed of the train vehicle along a provided track.

7 Claims, 5 Drawing Figures

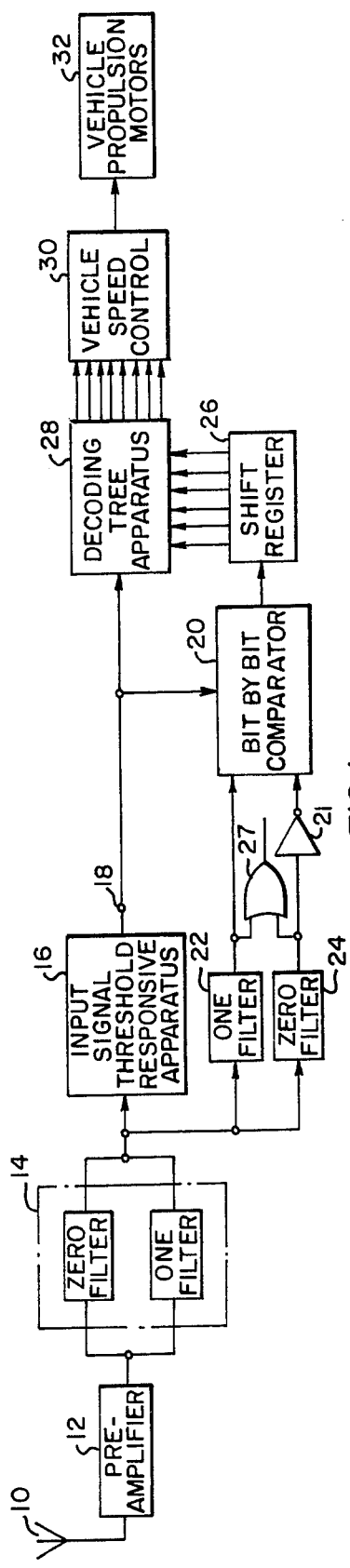
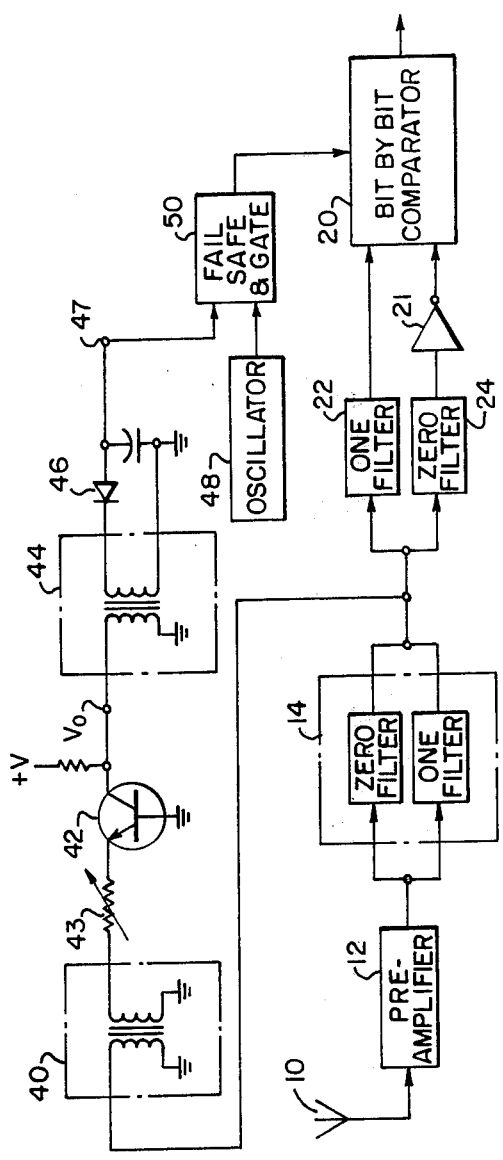
FIG. 1 PRIOR ART
FIG. 2 PRIOR ART

3,966,148

SIGNAL THRESHOLD RESPONSIVE APPARATUS

CROSS REFERENCE TO RELATED APPLICATIONS

Reference is made to U.S. Pat. No. 3,551,889 of C. S. Miller, to U.S. Pat. No. 3,562,712 of G. M. Thorne-Booth, to U.S. Pat. No. 3,600,604 of G. M. Thorne-Booth, to U.S. Pat. No. 3,657,663 to R. S. Rhoton et al., to U.S. Pat. No. 3,760,192 of J. O. G. Darrow, to U.S. Pat. No. 3,810,161 of A. P. Sahasrabudhe, to U.S. Pat. No. 3,842,334 of J. H. Franz and to Reissue U.S. Pat. No. 27,472 of G. M. Thorne-Booth, which are assigned to the same assignee.

BACKGROUND OF THE INVENTION

In the operation of prior art train vehicle speed control signal decoding apparatus, a fail-safe signal threshold determination is required. This has been provided in relation to base-emitter junction voltage drop of a common base transistor stage, with the output of same becoming an A.C. enable signal in conjunction with a fail-safe AND logic gate. It is desired that a predetermined minimum amount of input signal energy, in relation to the voltage and time product of that energy, be required before the train speed control system is enabled to become operative. This involves a transformation from the sensed input speed coded signal, which can be one of several different frequencies and different amplitudes, into an enable signal having predetermined characteristics.

A threshold signal detection operation requires a reference threshold to establish what input signal is above and desired as compared to what input signal is below and not desired in relation to that reference threshold. This reference can be obtained with a PN junction, such as the base emitter PN junction of an NPN transistor, used in a grounded common base mode driven by a transformer secondary, with no D.C. bias in the loop and no circulating D.C. currents. The A.C. input signal from the train vehicle track signal block passes through a set of band pass filters, to select the desired frequency input signals. A common carrier frequency signal is improved for each particular signal block and does not change, but the desired speed code frequency and phase modulation for each signal block can change. Six bit comma-free coded input signals, frequency shift keyed are used in this system, with phase shifts provided for clock purposes.

A synchronizing clock bit at 1/18 second intervals separates each bit by 180° phase shifts, having all the same frequency for five bits and then a frequency shift in relation to the last bit of a particular code. The vehicle carried speed signal receiver detects each phase shift and each frequency shift. The involved waveforms are described in above referenced U.S. Pat. No. 3,810,161 of A. P. Sahasrabudhe entitled Apparatus For Receiving A Frequency and Phase Coded Vehicle Control Signal. The amplitude modulated output signals from the filters are similar to waveforms D and E shown in above referenced U.S. Pat. No. 3,551,889 of C. S. Miller.

A published article, entitled "Automatic Train Control Concepts Are Implemented by Modern Equipment" by R. C. Hoyler in the Westinghouse Engineer for September 1972 at pages 145 to 151, describes the automated train control system applied for the San Francisco Bay Area Rapid Transit (BART).

SUMMARY OF THE INVENTION

In accordance with the present invention, the desired input signal for controlling the operation of a train vehicle within a track circuit signal block is determined by sensing the desired input signal as having a predetermined threshold level or amount of signal energy within that signal block. A transformation of that desired input signal, from among several signals having different frequencies and having different amplitudes, is made through operation of a rectifier and an oscillator into an enabling signal having predetermined characteristics. This enabling signal is operative with the train vehicle control system for controlling the train vehicle. The desired input signal is used to generate the most negative voltage in the train vehicle control system, with the fail-safety of the desired input signal transformation being established in relation to the threshold level or amount of input signal energy required before the enabling signal is provided.

BRIEF DESCRIPTION OF THE DRAWINGS

FIG. 1 is a diagrammatic showing of a vehicle control system utilizing an input signal threshold responsive apparatus;

FIG. 2 is a schematic illustration of a prior art input signal threshold responsive apparatus;

DESCRIPTION OF A VEHICLE SPEED CONTROL SYSTEM

Figure 4:
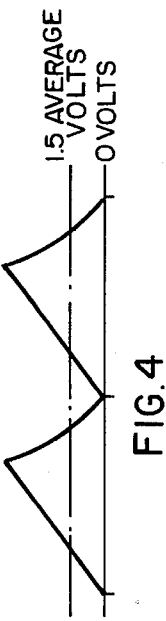
FIG. 4 shows an illustrative signal waveform in relation to the charging cycle of the capacitor shown in FIG. 3.

In FIG. 1 there is shown a well known vehicle control system, with the frequency and phase modulated speed coded signal from the vehicle occupied signal block being received by the antenna 10 and supplied to pre-amplifier 12. A signal filter apparatus 14, including a ONE signal filter and a ZERO signal filter for each of the provided signal carrier frequencies such as three or four, is operative to pass the carrier frequency signals present within the vehicle occupied signal block. An input signal energy threshold responsive apparatus 16 is responsive to a predetermined one of the carrier frequency signals output by the respective signal filters within the signal filter apparatus 14.

It is desired that the vehicle control system respond to a valid input signal at the output of the filter apparatus 14, and ultimately it is desired to provide an output A.C. carrier signal as a system enable signal on output 18, with the presence thereof meaning a valid input signal has been received having a voltage magnitude greater than a predetermined threshold voltage. This output enable signal at output 18 can go to enable a bit by bit comparator 20, for example, for the comparison of speed signal bits received. If the valid input signal passes through and appears at the output of the filter apparatus 14 with enough energy content, then an A.C. carrier enable signal is provided at output 18 to enable the vehicle control system. A pair of filters 22 and 24 is provided for data recovery, with a first filter 22 providing the ZERO data and the second filter 24 providing the ONE data. In addition the respective outputs of the latter two filters 22 and 24 are connected to an OR device 27 to provide the desired 18 Hertz clock pulses. The ONE's data and the ZERO's data are compared in the bit by bit comparator 20, with one of the data signals being inverted by inverter 21 such that the two signals now should be the same. A suitable bit by bit comparator 20 for this purpose is described in copending patent application Ser. No. 568,226, filed Apr. 15, 1975, entitled Speed Command Receiver of A. P. Sahasrabudhe et al. The A.C. enable signal controls the operation of this comparator 20. The output of the comparator is a detected speed code signal, such as a ONE's signal, to indicate that the recovered data ONE's signal and the recovered data ZERO's signal compare properly. The detected speed code signal output by the comparator is a six bit serial and comma-free code speed signal, which is applied to a shift register 26 to provide a serial to parallel conversion operation such that a desired one of the available six output signals is thereby provided to a decoding tree apparatus 28, comprising fail-safe AND gates, arranged to output one of the eight desired speed control signals. The output speed control signal from the decoding apparatus 28 is applied to the vehicle speed control 30 which is operative to energize the vehicle propulsion motors 32 to provide the desired vehicle speed in the occupied signal block. In general, FIG. 1 shows the prior art BART train speed control apparatus in operation at the present time.

A given track circuit signal block may contain a plurality of signals, such as the valid speed code signal desired to that signal block, one or more cross-talk signals from adjacent signal blocks, propulsion motor signal spikes and the like. The vehicle occupying that given signal block includes all suitable filters for the whole system, not only a pair of signal filters whose center frequency corresponds to the desired carrier frequency for this given signal block, but also pairs of signal filters for the other provided carrier frequencies of the other signal blocks, such as the plural carrier frequencies described in above referenced U.S. Pat. No. 3,562,712 of G. M. Thorne-Booth and U.S. Pat. No. 3,551,889 of C. S. Miller and Reissue U.S. Pat. No. 27,472 of G. M. Thorne-Booth. Thusly, a typical vehicle carries eight filters in the filter apparatus 14, with both a ZERO and ONE filter being provided for each of the involved four carrier frequencies, and any time the antenna 10 receives one of those eight frequencies, the corresponding filter will provide an output signal. The antenna 10 receives the desired and valid speed code signal for the occupied signal block as well as all of the crosstalk signals, with the valid speed code signal being stronger and having a greater level of energy, such that only the valid speed code signal contains a minimum content of energy adequate to overcome the introduced threshold and thereby to enable the vehicle control system. The product of voltage and time in relation to the established voltage signal threshold apparatus 16 is operative for this purpose. The time part can be fixed by a capacitor charging and discharging rate that is known and constant. Therefore, if only the voltage of the input signal is sensed for a known time duration, in effect the average energy content of the input signal is sensed.

As shown in FIG. 2, a transformer 40, a base-emitter junction circuit of transistor 42, another transformer 44 and a rectifier 46 has previously been utilized to provide this signal threshold apparatus. An oscillator 48 can provide an A.C. carrier, and a fail-safe AND gate 50 provides the desired A.C. enable signal for the bit-by-bit comparator and the decoder tree, such as shown in FIG. 1.

The amplitude modulated input signal from the signal block goes through the secondary of transformer 40 to the base emitter circuit of transistor 42. Since there is no D.C. bias, if any current is to circulate in the base emitter circuit of the transistor 42 the input signal voltage must be large enough to overcome the threshold of the base emitter voltage drop. When the collector current starts to circulate, an output voltage $V_o$ will be established as some function of the applied input signal voltage added to the base emitter drop. When an output signal voltage $V_o$ is provided, this means that the applied input signal voltage was large enough to overcome the threshold reference base emitter voltage drop. The output voltage $V_o$ will be at carrier signal frequency, and includes the amplitude modulation of the input signal, and in this way the vehicle control system knows this is a valid input signal. The input signal is decoded by the filters 22 and 24 to get the speed coded signal data, and the associated output signal from output terminal 47 is then used to enable an A.C. carrier from a fail-safe AND gate, with the presence of the A.C. carrier signifying the input signal was valid. A series resistance 43 in the emitter circuit can be included to vary the signal reference threshold, or the previous signal amplification by the preamplifier 12 or voltage gain can be selected or scaled to provide this desired input signal energy threshold sensitivity, through fail-safe linear amplifiers.

The use of a fail-safe AND gate to provide an enabling A.C. carrier signal is described in above mentioned patent application Ser. No. 568,226, filed Apr. 15, 1975, of A. P. Sahasrabudhe et al. and U.S. Pat. No. 3,600,604 of G. M. Thorne-Booth. The fail-safe AND gate has an A.C. carrier input and requires a D.C. input enable for the AND gate to output the A.C. carrier. The D.C. enable is generated by a simple negative rectifier circuit, which rectifies the negative half cycles. For fail-safe design it is desired that this be a more negative signal than any other signals in the system, i.e. if zero volts is most negative of provided speed signals then this D.C. enable could be minus 15 volts.

Figure 3:
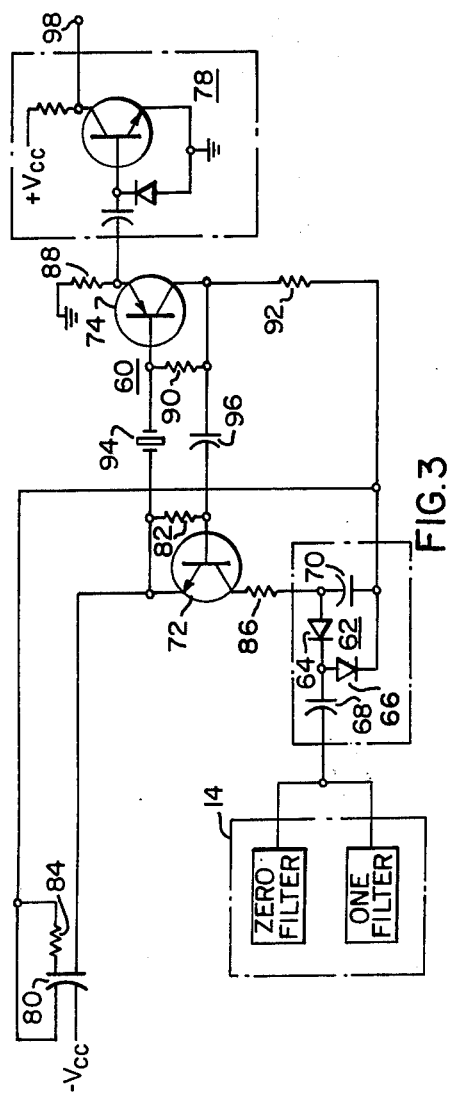
FIG. 3 is a schematic showing of the present input signal threshold responsive apparatus.

In FIG. 3, there is shown an oscillator 60 which requires a certain known amount of input signal energy to oscillate, and this amount of input signal energy is the desired and provided input signal responsive threshold.

The input signal from the filter apparatus 14 is used to generate a D.C. first output signal by the voltage doubling rectifier 62, which D.C. signal runs the oscillator 60 for providing a second output signal when the voltage of the input signal has enough energy to run the oscillator. If the oscillator operates, it is assumed thereby that the input signal is valid. The input signal from the antenna passes through the filter apparatus 14, and it creates a D.C. voltage through operation of the voltage doubler rectifier circuit. When an A.C. input signal is applied to the rectifier circuit 62, during the positive half cycle since a first diode 64 is reverse biased and the second diode 66 is forward biased, the capacitor 68 will charge to some positive voltage. During the negative half cycle the first diode 64 is forward biased and the second diode 66 is reverse biased, so the second capacitor 70 will charge in addition to the charge on the first capacitor 68 which now transfers its charge to the second capacitor 70. For each A.C. wave of the input signal, the above operation will repeat itself. The capacitor values can be selected to determine the amount of transfer charge to the second capacitor 70. The input signal voltage is approximately doubled by this apparatus. Since it is desired to operate for fail safety reasons with an output voltage from the rectifier 62 more negative than the normal most negative voltage of the vehicle control system, a negative voltage is supplied to the oscillator 60 by the second capacitor 70, which negative voltage is then used to drive the oscillator 60.

The A.C. enable signal from the signal threshold apparatus should have a known frequency. Therefore, a crystal oscillator 60 is employed for this purpose, since it is more stable in its operation. In addition, any failure of that oscillator 60 should not operate to reduce the reference threshold sensitivity in relation to applied input signals. Thusly, for any circuit component failure, it is desired that either the oscillator 60 will not oscillate or it will oscillate for a greater amount of input signal energy.

The oscillator 60 is a positive feedback oscillator, having two gain stages. The collector circuit of the transistor 72 provides a gain stage, and this goes into the base of transistor 74 to provide a second gain stage whence the signal is amplified again and inverted at the same time and fed back into the base of transistor 72. The transistor 72 effects a first inversion of the applied input signal and the transistor 74 effects a second inversion of that signal, so that the resulting polarity is not the same as the polarity of the initial input signals, such that a feedback oscillator circuit is thereby provided. The output is taken from the emitter of transistor 74 and goes to a switching stage 78 to level shift. The oscillator 60 is working with an input signal voltage which is more negative than the most negative normal vehicle control system voltage. If it is desired to get the output signal voltage to an energy level which is adequate to be compatible with the other apparatus in the vehicle control system and large enough to drive the following chain of circuits subsequent to the oscillator. This level shifting stage 78 gets the output of the oscillator to a large enough level to be compatible with the system voltage source. The level shifter 78 amplifies and shifts the level of the output signal from the oscillator 60.

Since the transistors 72 and 74 are bipolar junction transistors, biasing components are needed. The bias is such that the four terminal capacitor 80 is connected to voltage source $-V_{cc}$ which is selected to be the most negative signal in the system, for example the latter would be zero volts in the BART vehicle control system presently in operation in San Francisco, California. The plus side of capacitor 70 is in effect at this same voltage source $-V_{cc}$, so the voltage doubler rectifier 62 or charge pump circuit is operating in relation to voltage source $-V_{cc}$. Therefore, the voltage on the negative side of capacitor 70 will be more negative than voltage source $-V_{cc}$. The biasing resistor 82 is provided to bias the transistor 72, using for example minus two $V_{cc}$. The D.C. current flows from the plus side of capacitor 70 through the resistor 84 and through the base collector circuit of transistor 74 and through the base collector circuit of transistor 72, and resistor 86, back to the negative side of capacitor 70. This biases transistor 72, which is used in its reverse active region so that reasonable practical values of biasing resistors 82 and 84 can be obtained such that required energy for oscillation increases for both an increase and a decrease in resistor values. The transistors 74 is biased, starting from ground potential through resistor 88, the base emitter junction of transistor 74, through the resistor 90 to provide the base current for transistor 74, through resistor 92 and back to voltage $-V_{cc}$.

There is a reason for selecting the ground potential to be zero volts when $-V_{cc}$ is at minus 15 volts or for selecting the ground potential to be plus twelve volts when $-V_{cc}$ is at zero volts. This is important because of what happens when specific circuit failures occur. The D.C. bias for transistors 74 and 72 is established by resistors 84, 82, 86, 88, 90 and so forth. The crystal 94 is an A.C. coupled device and so is capacitor 96, so there is no D.C. bias current flow through these devices.

The input signals coming in through the antenna coupled with the signal block track circuit and then the filter apparatus 14 are of several different frequencies and they are amplitude modulated. These input signal frequencies cannot be used for the A.C. enable signals, since the carrier frequency changes for each signal block, and possibly the downstream fail-safe AND gates may have different sensitivities in relation to these different frequencies, such that the desired logic operations will not operate satisfactorily. In addition the input signals are amplitude modulated, so the system could be turning ON and OFF in its operation in response to such modulation. It is desired that a predetermined A.C. enable signal at the output 98 of the level shifter 78 be provided in response to any one of the carrier frequency input signals to which the antenna is intended to respond, which output A.C. enable signal has substantially constant frequency and constant amplitude. The operation of the fail-safe input signal threshold responsive apparatus shown in FIG. 3 provides at the output 98 such an output A.C. enable signal, with the constant frequency being established by the crystal oscillator 60.

Figure 5:
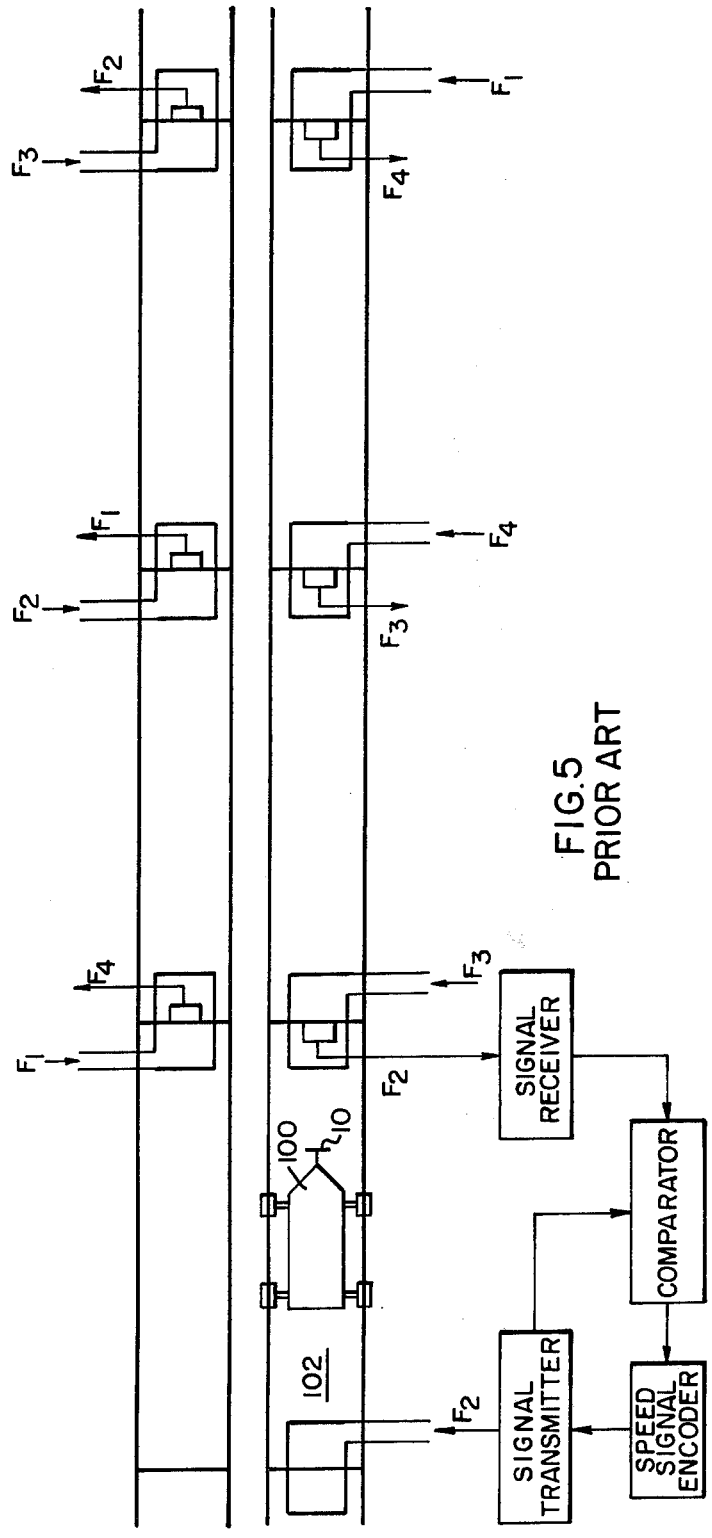
FIG. 5 is a diagrammatic showing of a typical track circuit signal block arrangement for controlling the operation of a train vehicle.

The selection of a particular speed coded carrier frequency signal from within a given signal block is accomplished by the fact that this particular carrier frequency signal will be stronger than the other carrier frequency signals within that signal block. Once the signal block frequencies and physical track arrangements have been established, such as shown in FIG. 5, and a train vehicle 100 is positioned within a given signal block 102, then all of the input signals received by the antenna 10 located at the front of the vehicle 100 can be studied and evaluated for the amount of cross-talk signals and so forth. The vehicle carrier signal receiver as partially shown in FIG. 1, includes a different pair of filters within the filter apparatus 14 for each of the four provided carrier frequency signals to be received by that receiver as the train vehicle 100 moves along the track. The energy level of the valid input signal received for a given block 102 can be established in relation to the respective energy levels of the cross-talk signals received. Since all of these input signal levels are determined by the physical layout of the track circuit signal blocks, the threshold energy level of the desired valid input signal can be determined to be greater in a given signal block 102 than are the other input signals. For BART this threshold energy level of the valid input signal is determined to be in a given signal block greater than 30 milliamperes of rail current, and the system cross-talk signal energy levels in that same given signal block are not greater than this 30 milliampere threshold, so the vehicle carried receiver can distinguish the valid input signal from any cross-talk signals. For BART the cross-talk signal levels are kept below 16 milliamperes to provide a safety signal level differential.

The oscillator 60 shown in FIG. 3 is designed to require an input signal level, out of the provided input signal frequency sensitive filter apparatus 14, of greater than a predetermined milliampere threshold and only the valid input signal should be greater than this threshold within the given signal block. The resistors and other bias voltage controlling circuit elements are selected to establish this threshold signal sensitivity level. A certain minimum signal energy level is required before the circuit will oscillate, for example 1.5 volts D.C. average across the capacitor 70. The input signals are each amplitude modulated and the capacitor 70 is being periodically discharged by the provided circuit load. The waveform across the capacitor will therefore have a charging cycle and a discharging cycle, as generally shown in FIG. 4 and the average D.C. voltage of the waveform shown in FIG. 4 should be 1.5 volts or greater before the oscillator 60 begins to oscillate. This in turn can be related to the charge pump or rectifier circuit 62, by adding to this the voltage loss across the input signal filter apparatus 14 and ahead of the filter apparatus 14 a minimum peak to peak input signal voltage strength is thereby established. The gain of the preamp 12 shown in FIG. 1 is divided into this quantity, and an output voltage from the antenna 10, such as 0.1 volt, is thereby established. The antenna 10 is functionally the secondary winding of an air core transformer, with the primary of this transformer being the track circuit signal block within which the vehicle to be controlled is located. The desired speed coded carrier frequency signal current is flowing within that occupied signal block. The voltage across the antenna 10 is equal to $JWMI_p$, where M is the mutual inductance between the primary and the secondary of this transformer and $I_p$ is the signal block rail current. M is substantially fixed by the height of the vehicle carried antenna. W is $2\pi fc$, where $fc$ is the carrier frequency and this frequency is fixed for a given signal block. In order to receive a predetermined minimum threshold output voltage from the known antenna 10, the signal block current $I_p$ can thus be predetermined to be at least a desired value, such as 30 milliamperes. With the signal block current $I_p$ at least this desired value, the threshold peak to peak output voltage from antenna 10 can be calculated. The gain of preamplifier 12 can be determined accordingly and so forth in relation to the selection of the circuit components shown in FIG. 3, such that a desired oscillator threshold operation is provided and the oscillator will not oscillate below a 1.5 volts input signal and the rectifier 62 is determined to be operative with this same threshold sensitivity and not have failure modes such that the threshold sensitivity is decreased. Thusly, when failed the rectifier 62 should not transfer more signal level energy to the oscillator 60 than would normally be provided for a signal block current of at least the predetermined desired value, such as 30 milliamps.

The energy content of a minimum signal block current for a valid speed coded input signal is transformed into D.C. voltage storage energy in capacitor 70 and then the A.C. enable signal providing oscillator 60 is the load on this capacitor 70. The A.C. enable signal providing oscillator circuit is thereby fail-safe in its signal generation, with the oscillator 60 selecting the threshold signal level. The oscillator does oscillate or does not oscillate in response to the applied input signal voltage level being above or below a predetermined threshold value. The rectifier operation is such that any failure of any circuit component shown in FIG. 3 will prevent the rectifier output voltage reaching the predetermined minimum threshold value, i.e., more energy will not be transferred to the input of the oscillator, than is normally provided in relation to a valid speed coded input signal.

I claim:

1. In a vehicle control system including signal threshold apparatus responsive to a coded input signal provided within a signal block of a track along which a vehicle is operative for controlling the vehicle occupying said signal block, the combination comprising
    means operative with said vehicle for providing a first output signal having an energy level in accordance with the energy level of said coded input signal,
    means including an oscillator for providing a second output signal in accordance with said first output signal having at least a predetermined energy level at which said oscillator will oscillate, and
    means responsive to the second output signal for controlling the operation of said vehicle within said signal block.

2. The control system of claim 1, with said first output signal being a direct current signal and with said second output signal being an alternating current signal.

3. The control system of claim 1, with said means for providing a first output signal including a rectifier apparatus having a predetermined characteristic in relation to the energy level of the coded input signal.

4. The control system of claim 1, with said oscillator being operative to provide said second output signal when the energy level of said first output signal in relation to a voltage and time product is at least said predetermined level.

5. In signal threshold responsive apparatus operative with a coded input signal for controlling a vehicle positioned within one signal block of a track including a plurality of said signal blocks, with each of said signal blocks containing at least one desired vehicle operation coded input signal, the combination comprising
    signal means operative with said vehicle and responsive to the desired vehicle operation coded input signal within said one signal block,
    means operative with said signal means for providing a first output signal having an amplitude determined by said energy level of the coded input signal, and
    means including an oscillator operative with said first output signal providing means when said amplitude is greater than a predetermined amplitude for providing a second output signal for determining the control of said vehicle.

6. The signal threshold responsive apparatus of claim 5, with said means for providing a first output signal being operative to rectify said desired vehicle operation coded input signal to provide a direct current first output signal.

7. The signal threshold responsive apparatus of claim 5, with said second output signal being operative to enable the control of said vehicle.

* * * * *